US007886795B2

(12) United States Patent
Gonzalez et al.

(10) Patent No.: US 7,886,795 B2

(45) Date of Patent: Feb. 15, 2011

(54) HIGH SPEED DECORATING SYSTEM

(75) Inventors: James P. Gonzalez, Lancaster, NY (US); David E. Zurawski, Clarence Center, NY (US); David B. Vaughn, North Tonawanda, NY (US)

(73) Assignee: Illinois Tool Works Inc., Glenview, IL (US)

( * ) Notice: Subject to any disclaimer, the term of this patent is extended or adjusted under 35 U.S.C. 154(b) by 897 days.

(21) Appl. No.: 11/676,609

(22) Filed: Feb. 20, 2007

(65) Prior Publication Data

US 2007/0209753 A1 Sep. 13, 2007

Related U.S. Application Data

(60) Provisional application No. 60/767,194, filed on Mar. 9, 2006.

(51) Int. Cl.
*B32B 41/00* (2006.01)

(52) U.S. Cl. ...................... 156/360; 156/361; 156/362; 156/366; 156/367

(58) Field of Classification Search ................ 156/360, 156/361, 362, 366, 367, 540, 542, DIG. 5, 156/DIG. 9, DIG. 33, DIG. 37, DIG. 45, 156/64, 212, 215, 238
See application file for complete search history.

(56) References Cited

U.S. PATENT DOCUMENTS 5,188,696 A 2/1993 Good
5,306,375 A 4/1994 Leonard
5,565,055 A 10/1996 Croci
5,709,770 A * 1/1998 Asghar et al. ............... 156/447
5,898,169 A * 4/1999 Nordbryhn ............. 250/223 B
6,199,614 B1 3/2001 Snyder et al.
6,325,877 B1 * 12/2001 Murphy ....................... 156/64
2003/0034111 A1 * 2/2003 Oldenburg et al. ............ 156/64
2006/0037706 A1 * 2/2006 Putzer ........................ 156/360
2006/0065371 A1 * 3/2006 Grabowski et al. .......... 156/538

OTHER PUBLICATIONS

International Search Report for International Application No. PCT/US2007/004778, Nov. 2, 2007.

* cited by examiner

*Primary Examiner*—George R Koch, III
(74) *Attorney, Agent, or Firm*—Levenfeld Pearlstein, LLC

(57) ABSTRACT

A label applicator system provides for high speed, accurate label transfer from a web to items moving on an item transport along a path relative to the system. The items, such as bottles, have a contoured surface. The applicator includes a supply reel for supplying labels on a web and a take-up for taking up the web after transfer of the label. A drive roller moves the web through the applicator system. The system includes a web positioning assembly and a movable label applicator head. A contour sensor senses the bottle contour and develops a profile for the head to follow to apply the labels to the bottles. The supply, take-up and the drive are operably engaged with one another to maintain a relatively constant tension in the web. The web positioning assembly is configured to advance and retract the web to accommodate a pitch difference between the bottles in the bottle transport and the labels on the web and to accommodate movement of the decorating head toward and away from the bottles in the bottle transport.

43 Claims, 6 Drawing Sheets

HIGH SPEED DECORATING SYSTEM

BACKGROUND OF THE INVENTION

The present invention relates to a decorating or graphic transfer system. More particularly, the present invention pertains to a high speed decorating system for label or graphic transfer that accommodates transfer to contoured surfaces and accommodates differences in pitch between the graphic and the receiving surface.

Containers, and particularly bottles, are often decorated with indicia, logos and the like, as well as information such as food stuffs ingredients and nutritional information. The decoration can be provided as a label that is, for example, glued or adhered to the bottle, or as printing applied directly to the bottle.

As to labeling the bottles, this can be done in a number of ways. For example, adhesives can be used to adhere the label (e.g., pressure sensitive labels) directly to the bottle, such as a film-like wrap around label commonly used on 2 liter soda-pop bottles. Other methods include adhering a full, sleeve-like label both to itself and to the bottle. Another method includes wax transfer labels, in which a label is transferred from a web having a wax release layer. The wax transfer labels provide the least degradation over time. In addition, unlike pressure sensitive labels, the wax transfer label does not have to be removed prior to recycling, which is a consideration that is of increasing importance.

Label applicator machines for transferring labels from the carrier web to the bottles have become complex. Due to the increasing demand on manufacturing efficiencies and the attendant costs, many such machines are designed to provide increased throughput with lower labor costs.

In addition, the complexity of bottle profiles has also placed a high demand on the operating equipment. In order to assure that the label properly transfers to the bottle, the bottle contour must be precisely known, and the indexing of the bottle vis-à-vis the label (e.g., an accommodation of the label and bottle pitches) must be made. These steps, however, are found to be difficult to carry out and time intensive.

Accordingly, there is a need for a high speed wax transfer decorating system that accurately maps the profile of a bottle and adjusts the label position and the label web speed to properly apply the label to the bottle. Desirably, such a system also accounts for the change in supply and take-up spool diameters to monitor the quantity of labels remaining on the web to provide indication that the label supply is running low.

BRIEF SUMMARY OF THE INVENTION

A label applicator system provides for high speed, accurate label transfer from a web to items moving on an item transport along a path relative to the system. The items, such as bottles, have a contoured surface.

The present system accurately maps the profile of the bottle and adjusts the label position as well as the label web speed to properly apply the label to the bottle. The system also accounts for the change in supply and take-up spool diameters as the label web moves through the applicator and the labels are transferred to the bottles (as the labels are used).

The applicator includes a supply, such as a reel for supplying the web (with the labels on the web) and a take-up for taking up the web after transfer of the label from the web to the bottle. A drive element such as a roller moves the web through the applicator system.

The application includes a web positioning assembly and a movable label applicator head. A contour sensor senses the bottle contour and develops a profile for the head to follow to apply the labels to the bottles. The overall system is controlled by a control system.

The supply, the take-up and the drive element are operably engaged with one another to maintain a relatively constant tension in the web. The web positioning assembly is configured to advance and retract the web to accommodate a pitch difference between the bottles in the bottle transport and the labels on the web. The web positioned assembly also advances and retracts to accommodate movement of the decorating head toward and away from the bottles in the bottle transport.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
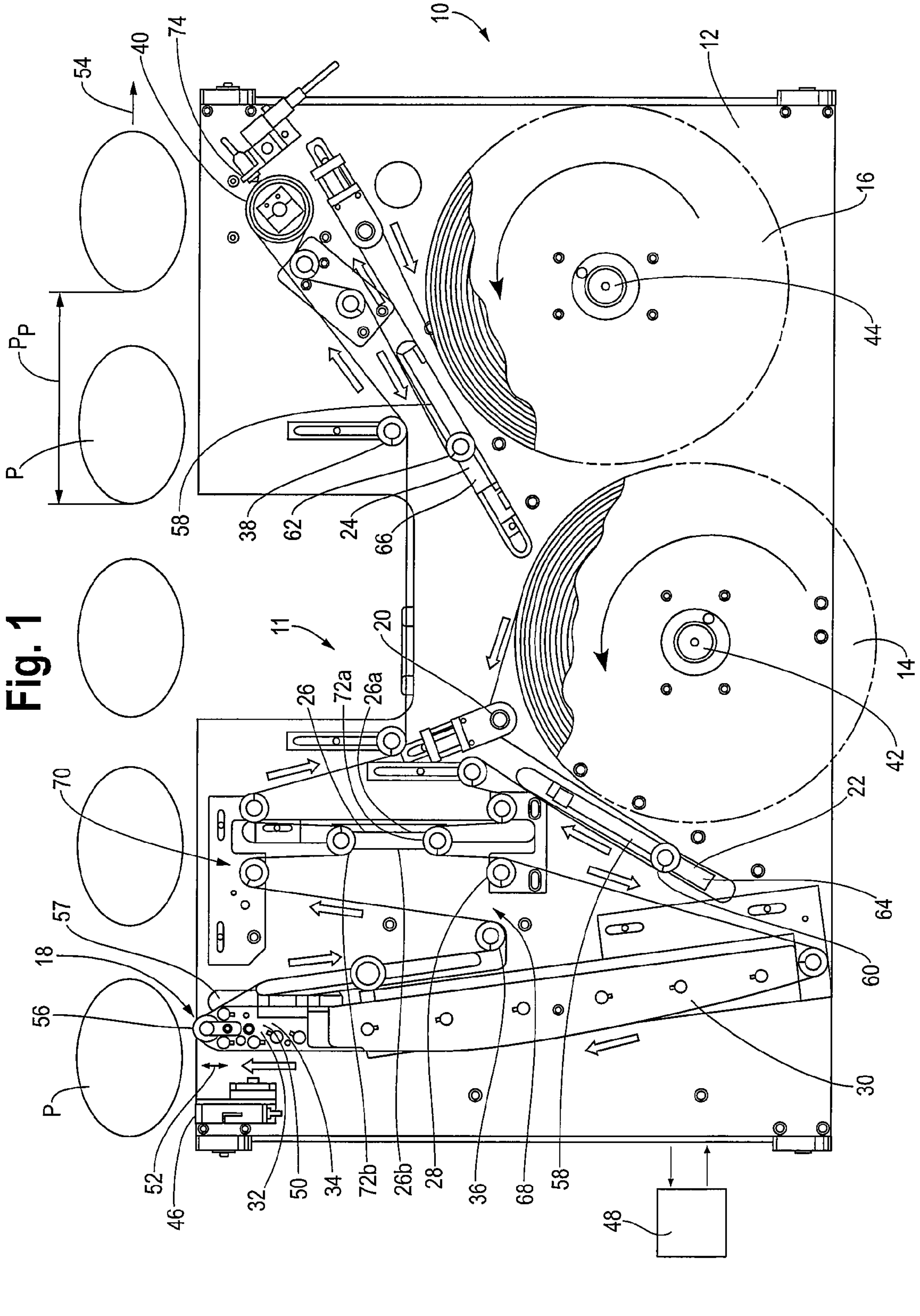
FIG. 1 is an illustration of a high speed decorating system embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular, to FIG. 1 there is shown an illustration of a high speed wax transfer system 10 embodying the principles of the present invention. The transfer system 10 includes a web transport system illustrated generally at 11, mounted to a frame 12 having a payout reel 14, from which a web W having labels L thereon are fed and a take-up reel 16 that takes up the web W after transfer of the labels L. As will be appreciated by those skilled in the art, generally, labels L are presented on a waxed web W that is wound around the payout reel 14, introduced to a decorating or applicator head 18 at which the labels L are separated from the web W and transferred to a product P such as a bottle, and the label-less web W is then rewound onto the take-up reel 16 for later processing.

The web W is fed from the payout reel 14 over a first roller 20 and is redirected to a payout analog dancer arm 22, over which the web W is again redirected. As will be discussed in detail below, the payout dancer arm 22, along with a take-up analog dancer arm 24, and the payout and take-up reel 14, 16 movements serve to maintain a constant tension on the web W as it moves through the applicator system 10 to orderly and accurately position labels L for transfer to the products P.

Moving along the web W path, from the payout dancer arm 22, the web W passes over one side 26*a* of a reciprocating servo web positioner 26, around additional (idler) rollers 28 and on to a heating element 30. The back side of the web W is heated and passes over the reciprocating servo decorating head 18 at which the label L is transferred from the web W onto the product P. A heater block indicated generally at 32 at the decorating head 18 (in the support 34 for the head 18) further heats the web W just prior to label L transfer. The label-less web W passes over additional idler rollers 36 and onto an opposing end 26*b* of the web positioner 26.

Following the web positioner 26, the web W passes over additional idler rollers 38 and over a servo-driven web feed roller 40 after which the web W traverses over the take-up dancer arm 24 and onto the take-up reel 16. The servo-driven web feed roller 40 provides the drive to move the web W through the system 10, while the payout and take up reels 14, 16 are intended to supply and take up the web W and to provide a general or gross tension in the web W.

Both the payout and take-up reels 14, 16 are also servo driven, mounted to shafts 42, 44 for rotation. The payout and take-up dancer arms 22, 24 are analog (e.g., linear) movement elements that move along respective paths that are about tangential to their respective reels 14, 16. The dancer arms 22, 24 are both biased (sprung, as indicated at 58) to maintain tension on the web W as it is fed from the payout reel 14 and as it is wound onto the take-up reel 16.

Figure 2:
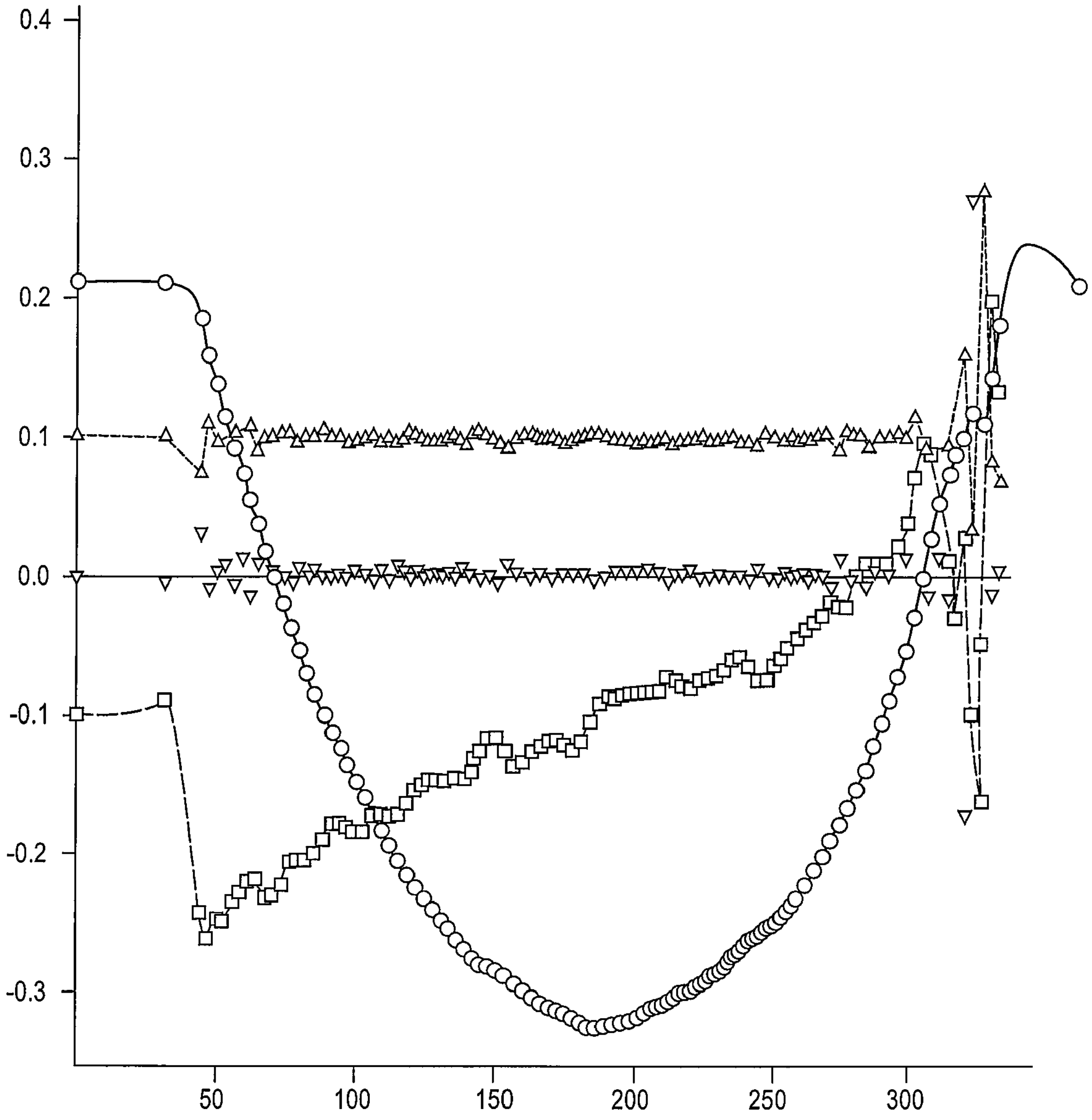
FIG. 2 is an exemplary bottle profile representing the surface contour of a typical bottle.
Figure 3:
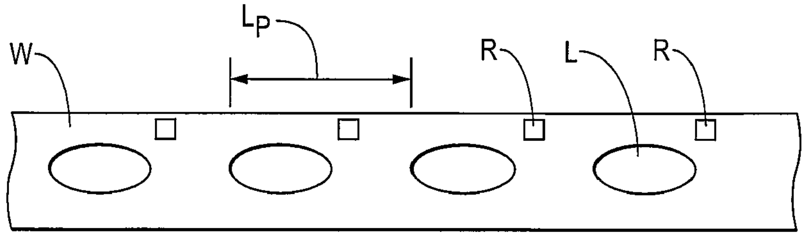
FIG. 3 is a plan view of a portion of an exemplary web with labels there showing the label pitch.
Figure 4:
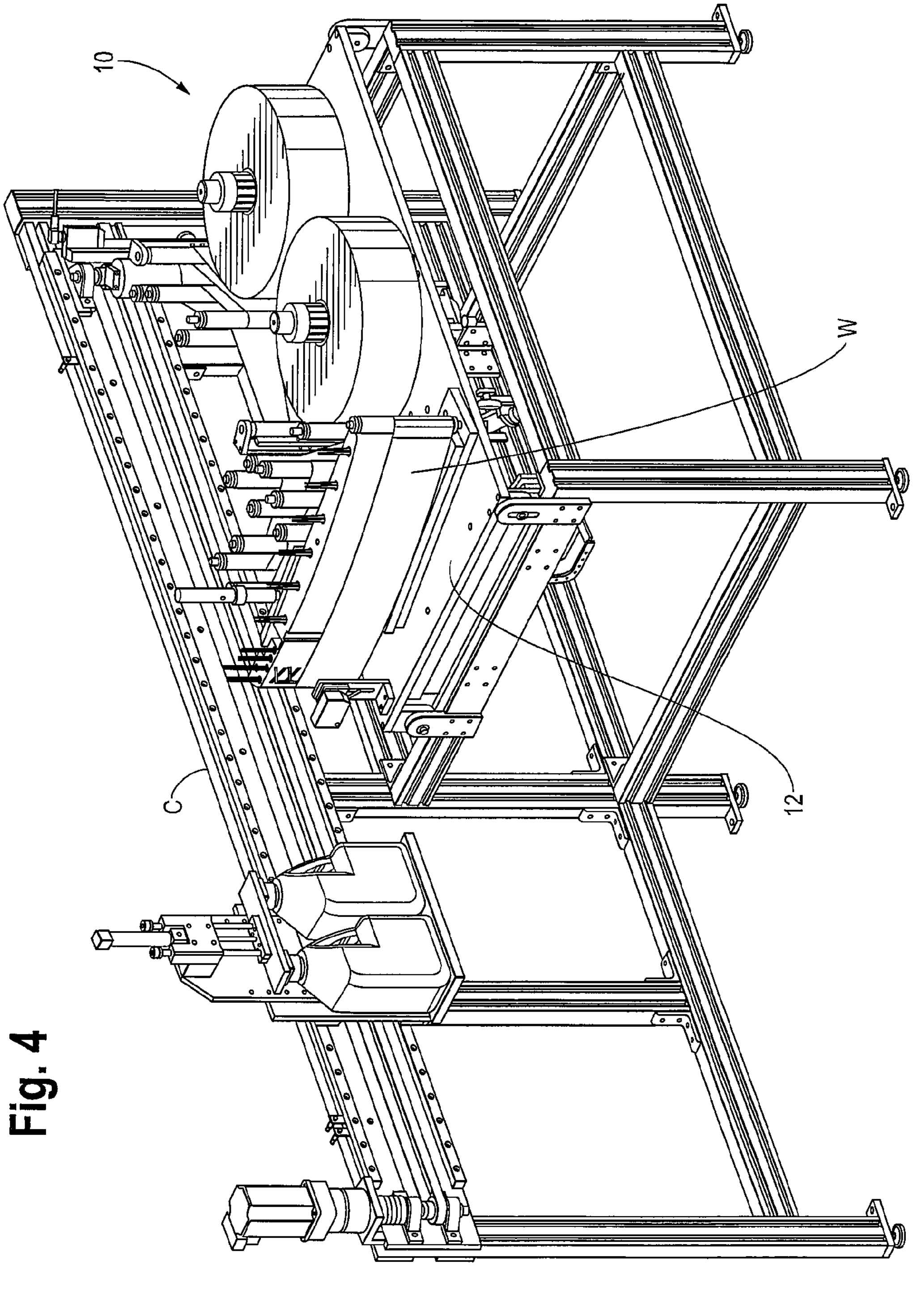
FIGS. 4 and 5 are perspective views of an embodiment of the high speed decorating system with two bottles mounted on a conveyor.
Figure 5:
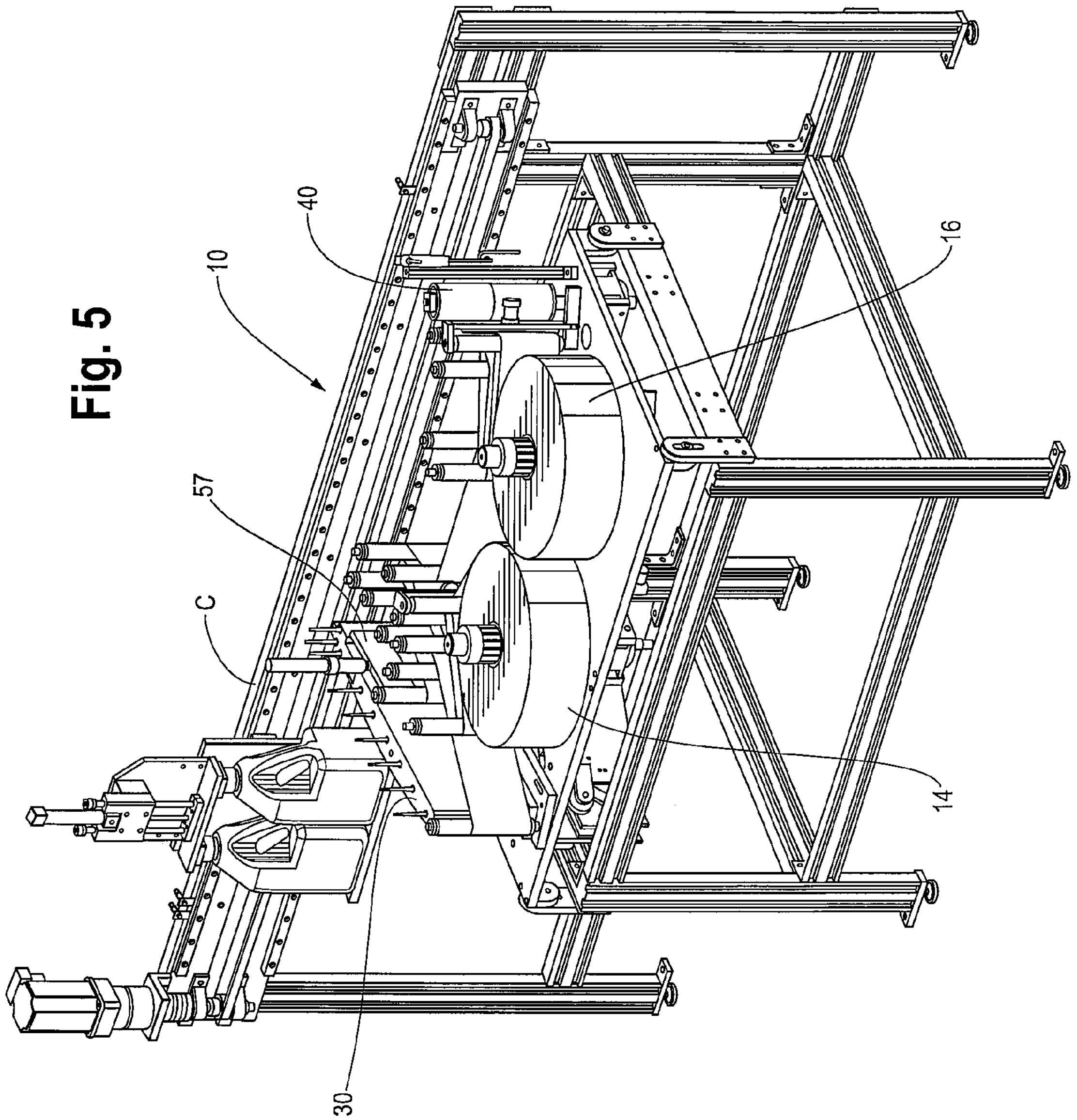

A laser sensor (head) 46 maps the profile or contour of the product P as it passes (or just prior to passing) the head 18. This is carried our for each "new" product profile. The laser 46 samples points from a start point (operator designated) along the product profile to an end point. A controller 48 includes code or commands such that the start and end points are mathematically blended to provide a smooth transition (rather than a sharp or step function) at the start and end of label L application. The mapping is a "learned" process, and a sample contour plot is illustrated in FIG. 2.

As the product (bottle) P is conveyed passed the laser sensor head 46 and the decorating head 18 (discussed below), it is inflated with compressed air. Inflating the products during label transfer is carried out to provide a resistance or back-pressure against the decorating head 18 pressing the label L to the product P and serves to maintain the intended or designed profile of the product P (e.g., product P shape) during label L transfer. Inflating during profile mapping assures that the mapped profile matches the profile of the product P during application.

Figure 6:
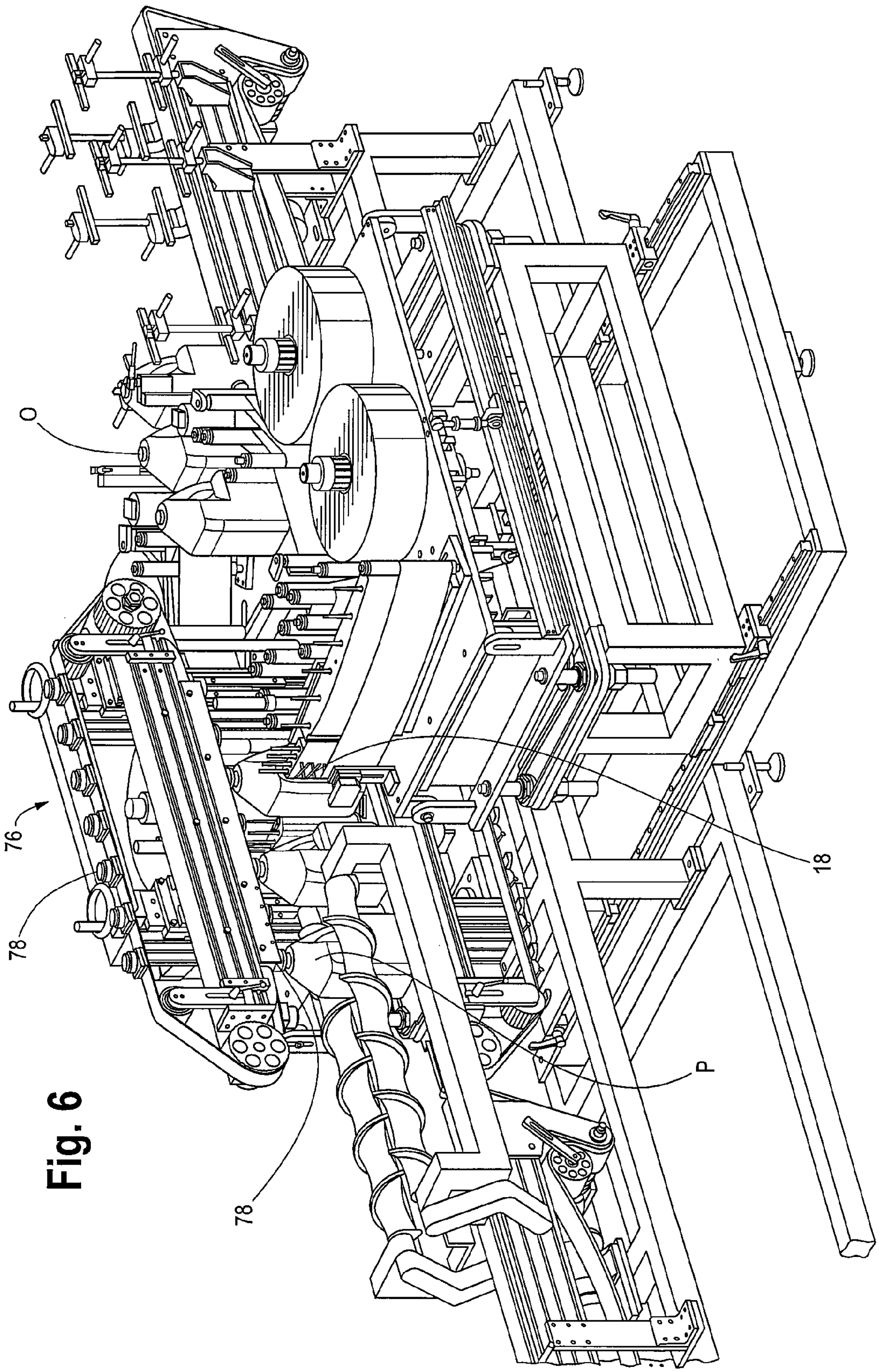
FIG. 6 is a partial perspective view of applicator system illustrating a product inflation subsystem.

Referring to FIG. 6, inflation is carried out at an inflation substation 76, by applying a moving cup seal 78 to an opening in the product (the open top O of the illustrated bottle) and introducing a predetermined quantity of compressed air into the product P through the cup seal 78. As the product P moves beyond the applicator 10, the cup seal 78 is removed from the product P thus allowing the product P to return to atmospheric pressure. The inflation pressure in the product is monitored to within about 0.1 psi to assure adequate inflation and to prevent over-inflation.

The decorating head 18 is also a servo-driven 50 element that reciprocates toward and away (as indicated by the double headed arrow at 52) from the product path 54, to move the web W and label L into contact with the product P in accordance with the mapping scheme developed by the laser head 46 and controller 48. Essentially, the mapping scheme (e.g., the laser taught contour) functions as an electronic cam to move the head 18 (and thus the web W and label L) to follow the product P profile. The cam profile is repeated once per product repeat pitch. The repeat pitch $P_P$ (i.e., the distance between the same point on two adjacent products P) is set by an operator and in a present transfer system 10 is variable between about 3 inches and about 9 inches; however, other repeat pitches are contemplated. When the repeat pitch is established, the head 18 is set to follow the cam profile at each repeat pitch interval.

The decorating head servo 50 is a linear movement element. It provides a high velocity, low inertia motion response to accurately follow the cam profile (or product contour) without exerting an over-pressure on the product P.

The head 18 includes a roller 56 (with the heater within the head support 34) to facilitate label L transfer. The web W is moved over the roller 56 at a speed that is matched to the product P movement during application. Between label L applications, the web W can change speed (increase or decrease) to properly position a next label for application to a next product, according to the product repeat pitch $P_P$ and the label pitch $L_P$ (the pitch of the labels L on the web W).

The decorating head roller 56 includes a matrix of holes and grooves (not shown) formed on its heated face, prior to the label transfer point. A vacuum is drawn at the face (again, prior to the transfer point) to the heated surface to assure fast and thorough heating of the label L. Immediately following transfer, the web W is cooled by passing the web W over a chiller plate 57 to cool the wax that remains on the web W. The chiller 57 is supplied with chilled air to cool the molten wax to prevent wax build-up on the adjacent surfaces (e.g., roller 36).

The present system 10 includes a number of features that enhance label L application speed and placement accuracy. First is the web transport system 11 which is configured to accurately move the web W through the applicator system 10 maintaining the web W at a fairly constant tension. The servo web feed roller 40 provides the motive force to move the web W through the system and the dancer arms 22, 24 are biased (as by springs 58) slides each having an idler roller 60, 62 at the end thereof over which the web W passes. The dancer arms 22, 24 provide for proper tension of the web W and are used to monitor the quantity of labels/web on the payout and take-up reels, 14, 16, respectively.

The position of each arm 22, 24 is monitored by a scaled analog signal transmitted from a transducer 64, 66 mounted to the slide 22, 24. In that the web W is looped over the rollers 60, 62, a one inch (linear) movement of either arm 22, 24 translates to a 2 inch linear movement of the web W. This is then compared to rotational movement of the reel 14, 16 (or conversely, how far the arm 22, 24, moves compared to a predetermined number, e.g., one, rotation of the reel 14, 16), which is then used to determine the circumference of the reel 14, 16 which corresponds to the quantity of labels/web on the reel 14, 16. Accordingly, the quantity of web W (an thus labels L) that remain on the payout reel 14 is know from the initial diameter, the rotational movement and the movement of the slide 22, 24. When a new roll of labels L is installed on the applicator system 10 the initial ratios are calculated by rotating the payout reel 14 (shaft 42) a predetermined distance until a target distance of the dancer arm 22 is detected. The rotation of the reel 14 (in degrees of rotation) that is needed to achieve the target arm 22 movement is calculated as a percentage of 360 degrees and this percentage is used to determine the initial circumference of the reel 14. By example, if 45 degrees of rotation is needed to produce a 3 inch movement of the dancer arm 22 (which is 6 inches of web W movement), the calculation of 360/45 yields a value of 8, which is then multiplied by the web W movement (6 inches) to yield an initial reel 14 circumference of 48 inches.

The next feature is the servo web positioner assembly 26 which defines a web path that is symmetrical before the decorating head 18 (as indicated generally by the arrow at 68) and after the decorating head (indicated generally at 70), e.g., a head approach path 68 which is between the payout reel 14 and the head 18 and an egress path 70 that is between the head 18 and the take-up reel 16.

The assembly includes a single servo actuator 26, which is a linear slide, having rollers 72*a,b* at the opposite ends 26*a,b*, with the roller 72*a* on one end 26*a* in the approach path 68 and the roller 72*b* on the opposing end 26*b* in the egress path 70. The egress path side 26*b* is nearer to the product path 54. In that the approach and egress paths 68, 70 are identical, movement of the web W is linear relative to the movement of the servo actuator 26.

As a result, as the web positioner servo 26 moves toward or away from the product path 54, the web W movement is two times that of the actuator 26, as long as the web W is held taut between the payout and take-up reels 14, 16. Web W movement is two times that of the servo 26 movement because the web W is looped around or over the rollers 72*a,b*. For example, a one inch movement of the actuator 26 away from the product path 54 (or into the approach path 68) results in a two inch linear forward movement (or advance) of the web W.

This movement of the web positioner servo 26 serves to accommodate two variables in the system, namely, the differences in the label pitch $L_P$ and product pitch $P_P$ and the differences in web W speed and product P speed. Where, for example product P speed is 360 inches per minute, labels L are applied at a rate of one (1) per second and the label pitch $L_P$ is 5 inches. If the product pitch $P_P$ is 6 inches, the web W moves at a speed of 300 inches per minute to account for the lesser label pitch $L_P$.

The web positioner servo 26 matches the web W speed to the product P speed during application of the label L to the product P. That is, the positioner servo 26 moves to "increase" the speed of the web W to a desired speed to provide a smooth transfer of the label L from the web W to the product P.

The web positioner servo 26 performs a cam profile once per product pitch $P_P$ to account for the pitch ($P_P$−$L_P$) differences. In between labels L (when the labels L are on a lesser pitch than the products), the cam profile jumps the positioner servo 26 to move the next label into position for transfer to the next product. In addition, using the web positioner servo 26, the web W can be run at a slightly faster or slower rate to control label L stretch during the application process.

It will also be appreciated that as the decorating head 18 reciprocates, it too advances and retracts the web W from its ordinary movement and speed. This movement of the web W must also be accommodated or accounted for in order to both position the label L properly and to match the web W speed with the product P speed. The web positioner servo 26 also serves to accommodate web W movement due to decorating head 18 movement to maintain the label L properly positioned for transfer.

In order to compensate for error in label L positioning as the decorating head 18 follows the product P contour, the positioner servo 26 and the decorating head roller 56 are geared to one another so that the position of the web W resulting from movement of the head 18 is compensated for by the positioner servo 26. For example, as the decorating head 18 moves toward the product P (following the profile), the positioner servo 26 moves away from the product path 54 an equal amount to prevent skewing of the label L.

Although the web feed roller 40 rotates at a relatively constant rate to move the web W through the applicator system 10 at a constant rate, it will be appreciated that the web W speed may not always be able to be maintained at a constant rate. Accordingly, a sensor eye 74 is mounted at the roller 40 to sense the presence or absence (or the indexing) of a registration mark R formed on the labels L or on the web W. The sensor eye 74 can be used (through the controller 48) to adjust the speed of the feed roller 40 to achieve a desired web W speed.

Figure 7:
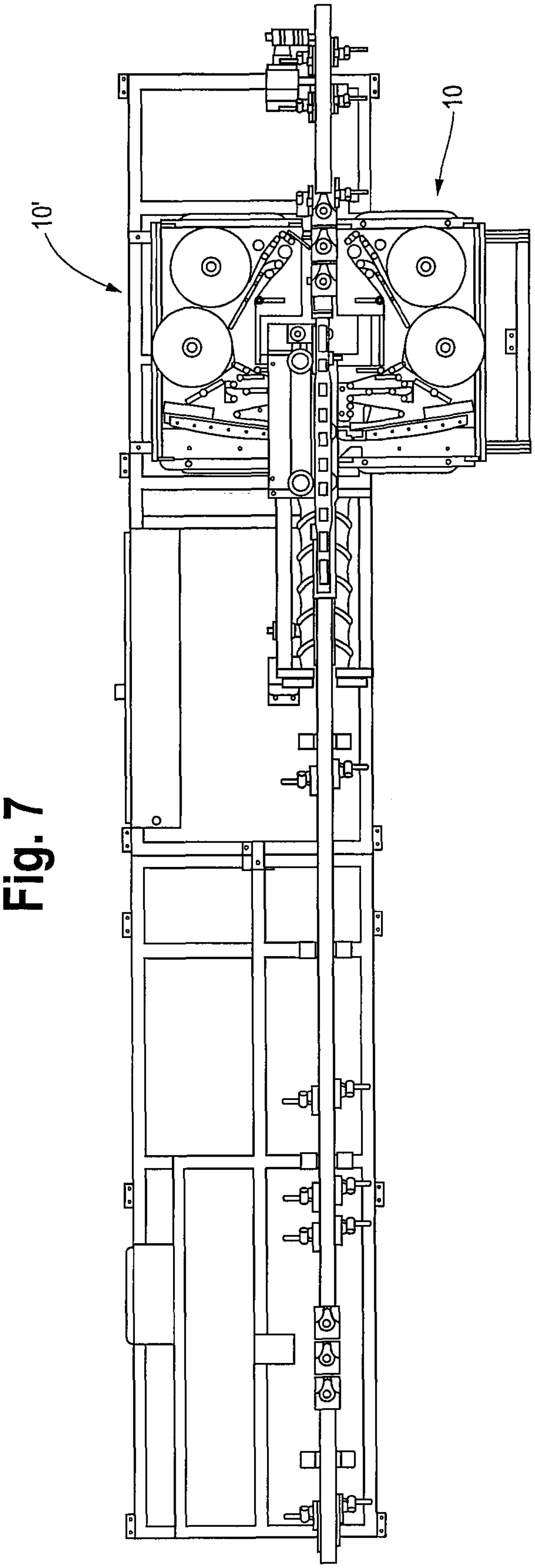
FIG. 7 is a top view of the applicator system of FIG. 6 showing a mirror image applicator or simultaneously applying labels to both sides of the bottles.

FIGS. 6 and 7 illustrate a labeling line that is configured for simultaneous two-sided application. The line includes labeling systems 10, 10' in mirror image relation to one another. In this manner labels can be applied to both sides of the product simultaneously and can make use of a single inflation subsystem.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover all such modifications as fall within the scope of the invention.

What is claimed is:

1. A label applicator system for transferring labels from a web to items moving on an item transport along a path relative to the system, the items having a contoured surface, comprising:

a supply for supplying the web with the labels thereon;

a take-up for taking up the web after transfer of the label from the web to the label;

a drive element for moving the web through the applicator system;

a movable label applicator head;

a contour sensor, the contour sensor including a laser configured to sense the contour of the item and to define the profile therefrom; and a control system, wherein the label applicator head is movable toward and away from the item in response to a profile sensed by the laser contour sensor to apply the label to the item as it moves passed the applicator head, and wherein the supply, the take-up and the drive element are operably engaged with one another to maintain a relatively constant tension in the web.

2. The label applicator system in accordance with claim 1 wherein the supply and the take-up are supply and take-up reels, the supply and take-up each having a biased dancer arm associated therewith, the dancer arms maintaining tension in the web as is moves through the applicator system.

3. The label applicator system in accordance with claim 2 wherein movement of the dancer arms is used to determine a circumference or a change in circumference of a respective supply or take-up reel.

4. The label applicator system in accordance with claim 3 wherein rotation of the respective supply or take-up reel in conjunction with movement of that reel's dancer arm is used to determine the circumference or change in circumference of that reel.

5. The label applicator system in accordance with claim 4 wherein the circumference or change in circumference of the reel is configured to monitor the quantity of the web on the reel.

6. The label applicator system in accordance with claim 1 wherein at least one of the supply, take-up and drive elements are servo-driven.

7. The label applicator system in accordance with claim 1 wherein a beginning and an end of the profile are smoothed to transition movement of the applicator head and to facilitate transfer of the label onto the item.

8. The label applicator system in accordance with claim 1 wherein the applicator head is a reciprocating servo driven element.

9. The label applicator system in accordance with claim 1 including an inflation system for inflating the item prior to transferring to the label.

10. The label applicator system in accordance with claim 1 wherein the drive element rotates at a predetermined speed and wherein the applicator system includes a sensor at about the drive element for sensing the passing of registration marks disposed on the web or the labels, and wherein a rate at which the registration marks pass the sensor is used to change the speed of the drive element.

11. The label applicator system in accordance with claim 1 including a web positioning assembly configured to advance and retract the web to accommodate a pitch difference between the items in the item transport and the labels on the web.

12. The label applicator system in accordance with claim 11 wherein the web positioning system includes a movable servo having first and second opposing ends, the first end disposed in an approach path to the applicator head and the second end disposed in an egress path following the applicator head, and wherein the movable servo reciprocates to advance and retract the web.

13. The label applicator system in accordance with claim 12 wherein the web is disposed symmetrically over the first and second ends of the movable servo.

14. The label applicator system in accordance with claim 13 wherein movement of the movable servo is linearly proportional to a distance of advancement or retraction of the web.

15. The label applicator system in accordance with claim 1 including a second label applicator system for transferring labels to two sides of the item.

16. The label applicator system in accordance with claim 15 wherein the two sided application is simultaneous.

17. The label applicator system in accordance with claim 1 wherein the labels are wax transfer labels.

18. The label applicator system in accordance with claim 12 wherein the applicator head and the movable servo are operably engaged with one another such that movement of the web due to movement of the applicator head is accommodated by movement of the movable servo.

19. A label applicator system for transferring labels from a web to items moving on an item transport along a path relative to the system, the items having a contoured surface, comprising:

a supply for supplying the web with the labels thereon;

a take-up for taking up the web after transfer of the label from the web to the label;

a drive element for moving the web through the applicator system;

a web positioning assembly;

a label applicator head;

a control system; and a contour sensor including a laser configured to sense the contour of the item and to define the profile therefrom, wherein the label applicator head is movable toward and away from the item in response to a profile of the item defined by the laser sensor to apply the label to the item as it moves passed the applicator head, and wherein the supply, the take-up and the drive element are operably engaged with one another to maintain a relatively constant tension in the web, and wherein the web positioning assembly is configured to advance and retract the web to accommodate a pitch difference between the items in the item transport and the labels on the web.

20. The label applicator system in accordance with claim 19 wherein the web positioning system includes a movable servo having first and second opposing ends, the first end disposed in an approach path to the applicator head and the second end disposed in an egress path following the applicator head, and wherein the movable servo reciprocates to advance and retract the web.

21. The label applicator system in accordance with claim 20 wherein the web is disposed symmetrically over the first and second ends of the movable servo.

22. The label applicator system in accordance with claim 21 wherein movement of the movable servo is linearly proportional to a distance of advancement or retraction of the web.

23. The label applicator system in accordance with claim 19 wherein the label applicator head movable is movable toward and away from the item.

24. The label applicator system in accordance with claim 19 wherein a beginning and an end of the profile are smoothed to transition movement of the applicator head and to facilitate transfer of the label onto the item.

25. The label applicator system in accordance with claim 19 including a second label applicator system for transferring labels to two sides of the item.

26. The label applicator system in accordance with claim 25 wherein the two sided application is simultaneous.

27. The label applicator system in accordance with claim 19 wherein the labels are wax transfer labels.

28. A label applicator system for transferring labels from a web to items moving on an item transport along a path relative to the system, the items having a contoured surface, comprising:

a supply for supplying the web with the labels thereon a take-up for taking up the web after transfer of the label from the web to the label;

a drive element for moving the web through the applicator system;

laser sensing means for sensing the contoured surface;

means for mapping the contoured surface; and a movable label applicator head operably engaged with the mapping means to move the head to follow the contoured as the label is transferred to the item.

29. The label applicator system in accordance with claim 28 including biased tensioning elements operably associated with each of the supply and take-up to maintain a substantially constant tension in the web.

30. The label applicator system in accordance with claim 29 wherein the supply and take-up are supply and take-up reels respectively and wherein the biased tensioning elements are operably associated with their respective supply and take-up reels to determine one or both of an amount of web with labels on the supply reel and an amount of web without labels on the take-up reel.

31. The label applicator system in accordance with claim 30 wherein the supply reel, the take-up reel, the drive element and the applicator head are servo-drive elements.

32. The label applicator system in accordance with claim 29 including a sensor operably associated with the drive element and wherein the sensor provides a signal to control the speed of the drive element in response to the presence of one or more marks on the web.

33. The label applicator system in accordance with claim 28 including a web positioning assembly for advancing and retracting the web in response to a difference in product pitch and label pitch and in response to movement of the applicator head and web.

34. The label applicator system in accordance with claim 28 including a second applicator system for transferring a label to a second side of the item.

35. The label applicator system in accordance with claim 34 wherein the labels are transferred to the first and second sides simultaneously.

36. The label applicator system in accordance with claim 28 including means for monitoring a level of the web on the supply.

37. The label applicator system in accordance with claim 28 including an inflating system for inflating the items.

38. A label applicator system for transferring labels from a web to items moving on an item transport along a path relative to the system, the items having a contoured surface, comprising:

a supply for supplying the web with the labels thereon a take-up for taking up the web after transfer of the label from the web to the label;

a drive element for moving the web through the applicator system;

a moving label applicator head for transferring the label to the item;

laser sensing means for sensing the contoured surface and means for mapping the contoured surface, wherein the label applicator head is operably engaged with the mapping means to move the head to follow the contoured as the label is transferred to the item; and a web positioning assembly for advancing and retracting the web in response to a difference in product pitch and label pitch and in response to movement of the applicator head and web.

39. The label applicator system in accordance with claim 38 wherein the supply and take-up are supply and take-up reels respectively and wherein the biased tensioning elements are operably associated with their respective supply and take-up reels to determine one or both of an amount of web with labels on the supply reel and an amount of web without labels on the take-up reel.

40. The label applicator system in accordance with claim 38 including a second applicator system for transferring a label to a second side of the item.

41. The label applicator system in accordance with claim 40 wherein the labels are transferred to the first and second sides simultaneously.

42. The label applicator system in accordance with claim 38 including means for monitoring a level of the web on the supply.

43. The label applicator system in accordance with claim 38 including an inflating system for inflating the items.

* * * * *